July 11, 1961 G. B. PACKARD 2,991,939
FLUID MIXING AND SPRAYING DEVICE
Filed Sept. 28, 1959
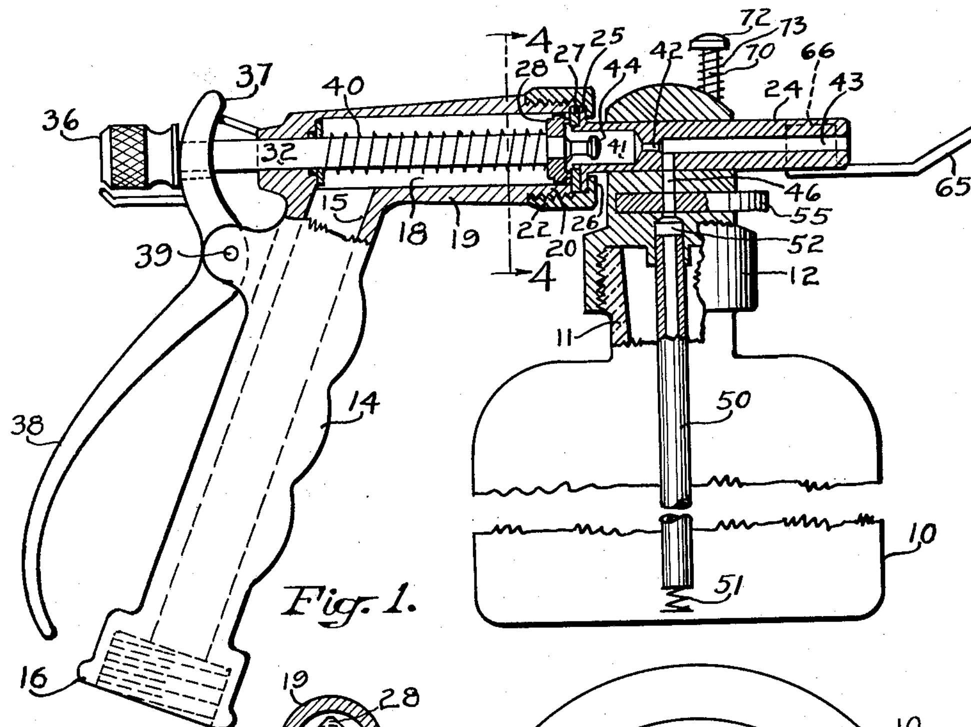
Fig. 1.
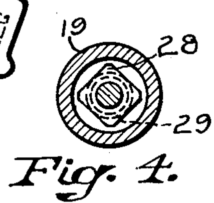
Fig. 4.
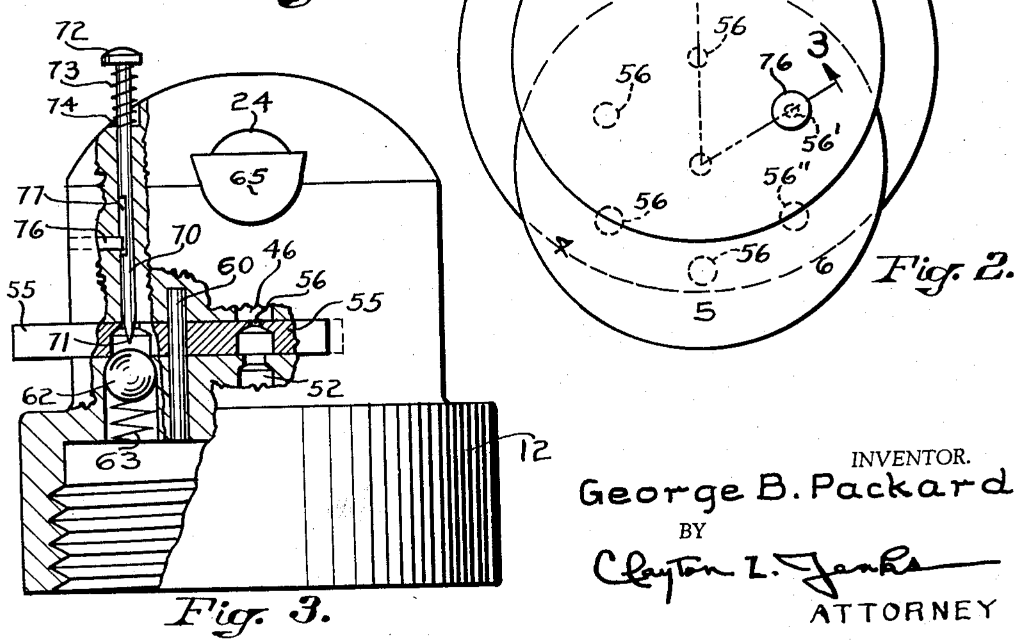
Fig. 2.
Fig. 3.
INVENTOR.
George B. Packard
BY
Clayton L. Jenks
ATTORNEY United States Patent Office 2,991,939

Patented July 11, 1961

2,991,939

FLUID MIXING AND SPRAYING DEVICE

George B. Packard, Shrewsbury, Mass., assignor to Barco Manufacturing Co., Inc., Worcester, Mass, a corporation of Massachusetts Filed Sept. 28, 1959, Ser. No. 843,017

3 Claims. (Cl. 239—114)

This invention relates to a spraying device, and more particularly to a device attachable to a water hose pipe which serves to educt fluid from an attached container and mingle it with the water as a stream or spray.

For the extermination of insects and plant pests as well as to control the growth of various weeds, a standard water hose connected to a hydrant or other source of water pressure is used to draw a desired chemical fluid from a container and mix the same with the water to be delivered as a spray. Various constructions have been employed for this purpose, but they have not been fully satisfactory for controlling and varying the proportions of the water and the chemical intermixed therewith. Furthermore, many of the chemicals used for spraying the lawn weeds or to control insect pests have been used as solids to be dissolved in the water, but such substances often do not go fully into solution and tend to clog the eduction orifice through which the materials are to be withdrawn by the partial vacuum created by the stream of the high speed water jet.

One object of this invention is to provide a water spray device of this type which may be readily adjusted to vary the proportions of the chemical and the water carrier and which may be conveniently and quickly regulated without dismantling or otherwise changing the construction.

A further object of the invention is to provide a readily operated mechanism for quickly cleaning the eduction orifice through which the material is drawn into the water stream by the partial vacuum and which may be readily manipulated during the use of the device. Other objects will be readily apparent in the following disclosure.

One feature of this invention is applied to a spraying device of a type wherein fluid in a container is forced into and through a spray nozzle and the volume of fluid flow is adjustably regulated. Another feature pertains to cleaning out the conduit which conducts the fluid to the spray nozzle. These are preferably combined in a spraying device comprising a valved spray nozzle attachable to a standard type of water hose which causes water to be ejected as a high speed small diameter jet adjacent an outlet orifice from a container, which is so constructed that a chemical fluid in the container is educted by a partial vacuum created by the jet and caused to mingle with the water and be sprayed from the exit nozzle. To control the proportions of the chemical and water, I provide an adjustably movable and preferably a rotary control plate having a series of orifices of different sizes which are arranged to be selectively located in the communicating passage between the chemical container and the high speed water jet, whereby the quantity of fluid withdrawn from the container is regulated by selecting a calibrated size of orifice in the movable plate. In order to dislodge any sediment which may have become deposited in a selected orifice of that adjustable plate and the adjacent passage, a clean-out pin is movably positioned where it may be thrust through the plate orifice to clean out the same, and the plate is then moved to position that cleaned orifice in the path of the chemical that is to be educted from the container.

Referring to the drawings illustrating one embodiment of this invention:

FIG. 1 is an elevational view, largely in section and partly broken away, showing the spraying nozzle comprising a manually controlled valve for a hose line, a chemical container and a conduit including a rotary orifice plate through which the chemical is withdrawn;

FIG. 2 is a diagrammatic plan view showing the arrangement of the orifices of the control plate relative to the exit tube from the container and the clean-out device;

FIG. 3 is an enlarged elevation, with parts in section taken on the line 3—3 of FIG. 2, showing the rotary control plate and the clean-out device; and FIG. 4 is a sectional detail on the line 4—4 of the nozzle valve.

Referring to the drawings showing a suitable spray nozzle embodying this invention, a desired chemical liquid to be mixed with water as a spray is held in a suitable container 10 provided preferably with a screw top 11 adapted to interfit removably with a cap 12 attached to the intermixing nozzle. Although many types of injector action spraying nozzles may be employed with the features of this invention, a preferred construction is illustrated in the drawings in which a stream of water under pressure is forced as a high velocity jet through a constricted passage into a larger space in a fluid mixing head where it creates a partial vacuum which serves to withdraw a chemical from the container. As illustrated, water is led under pressure through the conduit of a hollow barrel shaped handle 14 which is provided with a cylindrical passage 15 communicating at its lower end with the interior of a hollow fitting 16 which has an internal screw thread adapted to be connected to a water hose pipe. The upper end of the passage 15 leads into a further passage 18 within the body 19 of the water conduit which is fixed to or integral with the handle 14. The body 19 is shown as having a reduced threaded cylindrical end portion 20. A cap 22 having an internal thread is removably mounted on the end 20 and serves to hold the hollow spraying nozzle and fluid eductor tube 24 securely attached to and axially aligned with the bore 18 of the valve body. For this purpose, the cylindrical nozzle or tube 24 has an annular flange 25 at its inner end which is gripped by the annular end portion 26 of the cap and held tightly in place.

The valve structure comprises a flexible washer 27 seated against the inside of the flange 25 and surrounding the opening therethrough. A plunger disk 28 has an annular ridge 29 on its outer face (FIG. 4) adapted to be movably seated against the washer and close the passage therethrough. This disk is somewhat square in shape so that water may flow around its four faces. The disk is fixedly mounted on a reduced end of a plunger 32 which is movable axially of the passage 18. The plunger has a reduced end portion 34 carrying the disk 28, and the latter may serve as a guide member which rides within the bore 18 and guides the plunger 32 and yet permits the water to pass. The plunger rod 32 passes outwardly through an end opening in the left hand end of the nozzle casing 19, and it has a screw cap 36 on its end so arranged that the yoke 37 on the end of the operating handle 38 pivotally mounted at 39 on the casing 14 may move the rod 32 towards the left and open the valve. The rod is urged towards the right to close the valve by means of a helical compression spring 40 located between the plunger disk 28 and the opposite end of the passage 18 in the valve body.

The nozzle structure is suitably made to provide a partial vacuum for aspirating the chemical from the container 10. It is shown as comprising a large bore 41 in the nozzle body 24 which communicates through a narrow orifice 42 with a large bore 43 at the exit end of the nozzle. The plunger 32 has a reduced end projecting through the valve opening which carries a spreading flange 44 on its end, small enough to provide space for the flow of water therearound. The high speed jet of water issuing from the constricted passage 42 forms a partial vacuum at the beginning of the bore passage 43 and so serves by a Venturi action to draw liquid upwardly through the vertical passage 46 formed in the head of the cap 12 and a tube 50 leading from near the bottom of the container 10. The passage 46 and the tube 50 constitute an aspirating conduit for withdrawal of fluid from the container. The nozzle tube 24 is suitably mounted in a horizontal bore in the head. The tube 50 has a helical wire 51 or other form of strainer mounted in its bottom end, in accordance with standard practice, to prevent the ingress of large particles but provide for the passage of fluid. The upper end of the tube 50 projects into and is secured in a vertical opening 52 in the cap 12. The above described structure may be made otherwise in accordance with standard practice, or as desired.

In accordance with this invention, a slide plate is so mounted that any one of a series of orifices or openings therethrough may be located to control the flow of liquid into the spray nozzle. This is shown as a cylindrical disk 55 having a series of holes 56 (FIG. 2) graduated in size from the smallest one 56′ to the largest one 56″. Although the plate 55 may be shaped and mounted for other type of movement, it is shown as a cylindrical slide plate mounted for rotation about a pivot pin 60 (FIG. 3) which is suitably secured in the head of the cap 12. The plate 55 projects outwardly at the right (FIG. 1) where it may be grasped by thumb or finger, and a knurled edge may be provided so that the plate may be easily rotated. The plate 55 has a sliding fit between two parallel faces formed by milling a horizontal slot in the side of the cap 12. The holes or orifices 56 are arranged in a circle concentric with the axis of the pin 60, and the pin and holes are so located that one of the holes may be positioned exactly above the passage 52 at the top of the tube 50 of the chemical container, as indicated by a set of numbers on the disk. By rotating the slide plate 55, any one of the different sized holes may be brought into position where the fluid may be drawn upwardly into the conduit 46 in the nozzle head. A spherical detent 62 is held by a suitably mounted compression spring 63 where it may frictionally engage the under side of one of the openings 56, other than the one being used, and provide enough resistance to hold the plate 55 against accidental movent. Each opening 56 through the plate may be drilled out to the same size on the under side of the plate 55 to fit the detent and to provide an adequate fluid passage; but as indicated in FIG. 3, the upper portion of the orifice is accurately sized.

The shapes and arrangement of the parts and the various passages are such that the high velocity water stream passing through the constricted nozzle passage 42 creates a partial vacuum and draws the chemical upwardly through the selected orifice of the flow regulating plate 55 and causes it to mingle with the water that is traveling through the nozzle. By selecting one of the several calibrated openings 56 in the slide plate 55, the quantity of fluid drawn into the water is regulated. The head of the nozzle which forms no part of the present invention may be suitably constructed to provide a spray or a stream as desired. As shown, a flat plate 65 projects into the path of the stream from the nozzle and causes it to be deflected as a spray. The deflector is suitably secured to the end of the nozzle tube, as by means of a U-shaped spring clip 66 on the end of the deflector plate clamped around the end of the nozzle.

A further feature of the invention comprises a suitable device for cleaning out the fluid eduction hole leading from the chemical container. Although this device may be used for a single passage of standard construction, it is especially applicable to clean out any hole of the multiple orifice plate above described. To this end, as shown particularly in FIG. 3, a needle 70 having a bottom conical or pointed end 71 is so mounted that it may be thrust downwardly into any one of the holes 56 that is positioned thereunder. That is, the needle 70 is located, as is best shown in FIG. 3, in a vertical hole forming a bearing in which the needle is slidably movable. The needle is positioned on the opposite side of the pin 60 from the orifice 56 being used so that it may be thrust into the hole thereunder, and the parts are preferably so located that one of the holes 56 is beneath the needle when another hole is communicating with the bottle tube 50. The needle has a plunger head 72 at its top end, and a helical compression spring 73 mounted between a shoulder 74 on the head and the under side of the head 72 urges the needle outwardly away from a hole in the plate, so that it will not interfere with the rotation of the plate. When a hole is to be cleaned, then that particular hole is aligned with the needle as will be indicated by suitable graduations on the side of the plate and the plunger head 72 is depressed to thrust the needle into the hole 56. Since the holes are different sizes, it is preferred to have the bottom end 71 of the needle made conical or otherwise shaped so that the point will enter the smallest hole and an upper portion of the neddle cone will clear out the larger hole. Various expedients may be adopted to prevent the needle from being thrust outwardly by its spring. This is shown as comprising a pin 76 set in the side of the head and having its inner end riding in an elongated slot 77 in the side of the pin.

The operation of the device will be obvious in view of the above description. The plate 55 is rotated to locate the selected orifice 56 beneath the fluid passage 46 and thereby regulate the percentage of the chemical in the water spray. Then, by depressing the water control handle 38, the valve stem 32 is moved toward the left and a stream of water is caused to flow under pressure toward the right and through the passage 43. This high speed stream creates a partial vacuum in the passage 43 which causes fluid to rise through the tube 50 and the selected regulator plate orifice 56 and thus mingle with the water stream. If at any time the chemical passage becomes clogged, the plate is rotated to bring the clogged opening 56 beneath the clean-out needle 70 and the latter is pressed down one or more times to insure clearing the passage. By this construction, it is possible to make a very quick change in the regulation of the proportions of chemical and water as desired and to maintain the chemical outlet passage in the plate 55 cleared of any obstructions. Other advantages in this device will be readily apparent.

It will be appreciated that the above described construction serves as a pump or pressure producing means for forcing the chemical or fluid from its container 10 into the spray nozzle and there developing a spray or mist for the required purpose. Hence, the movable multiple orifice plate having orifices of different sizes may be employed in various types of spray developing constructions to control the rate or volume of flow of the fluid to be sprayed, wherein the force for removing and spraying the chemical may be developed by other forms of pump than the water injector type. Also, the clean-out device may be used with other types of spray devices having forced fluid feeds and is not limited to use with a water jet injector pump as above described. It will, therefore, be understood that the above disclosure is to be interpreted as setting forth the principles of this invention and a preferred embodiment thereof and not as imposing limitations on the appended claims.

I claim:

1. A device for mixing and spraying liquids comprising a conduit for water under pressure, a fluid mixing spray nozzle having a head providing an expansion chamber and a constricted passage connecting the water conduit with the expansion chamber which provides a high velocity water jet for the creation of a partial vacuum in the chamber, a manually operated valve for controlling the flow of said water in said conduit, a container for a fluid mounted beneath said head, an aspirating conduit leading to said expansion chamber for the withdrawal of fluid from the container, a plate having a metering orifice of restricted size which controls the flow of fluid through said aspirating conduit, said plate being movably mounted on the nozzle head for removing the metering orifice from an aspirating position to a clean out position remote from operative association with said aspirating conduit, means providing a needle slide bearing on the head, a clean out needle slideable in said bearing, said needle and its bearing being spaced laterally of the operative position of the metering orifice and so located that the needle may be inserted in the metering orifice only when the latter is in said clean out position, means to locate the slide plate with said orifice in either of said positions, and means including a spring which normally holds the needle away from the metering orifice and permits said movement of the plate.

2. A device according to claim 1 in which the plate has a plurality of different sized metering orifices, said plate being rotatably mounted for moving any of said orifices openings into operative association with the aspirating conduit, and the orifices and needle being so arranged that one orifice is located opposite the needle when another communicates with the conduit, the needle having a substantially conical end shaped to be inserted into and clean out orifices of different sizes.

3. A device according to claim 2 which comprises a pivot for the rotary plate mounted on the head, said plate orifices being so closely arranged relative to the pivot that the clean out position is beneath the head and above the container so that the clean out material may be returned to the container by the needle, and wherein the slide locating means comprises a spring pressed detent engaging the under side of the plate at its clean out orifice which is arranged to prevent escape of fluid into the needle bearing and permit the needle clean out action.

References Cited in the file of this patent

UNITED STATES PATENTS

| | | |
|---|---|---|
| 619,257 | Judd | Feb. 7, 1899 |
| 879,891 | Paasche | Feb. 25, 1908 |
| 881,842 | Bender | Mar. 10, 1908 |
| 980,538 | Leopold | Jan. 3, 1911 |
| 2,153,240 | Dailey et al. | Apr. 4, 1939 |
| 2,788,244 | Gilmour | Apr. 9, 1957 |
| 2,789,010 | Dean | Apr. 16, 1957 |